No. 645,602. Patented Mar. 20, 1900.
J. W. MILLER.
HORSESHOE CALK.
(Application filed June 7, 1899.)
(No Model.)

Witnesses
Ralph A. Shepard
H. J. Riley

J. W. Miller Inventor
By his Attorneys,
C. A. Snow & Co.

UNITED STATES PATENT OFFICE.

JOHN WALLACE MILLER, OF MUHLENBERG, PENNSYLVANIA.

HORSESHOE-CALK.

SPECIFICATION forming part of Letters Patent No. 645,602, dated March 20, 1900.

Application filed June 7, 1899. Serial No. 719,698. (No model.)

*To all whom it may concern:*

Be it known that I, JOHN WALLACE MILLER, a citizen of the United States, residing in Muhlenberg, (Bernhart's P. O.,) in the county of Berks and State of Pennsylvania, have invented a new and useful Horseshoe-Calk, of which the following is a specification.

The invention relates to improvements in horseshoe-calks.

The object of the present invention is to improve the construction of horseshoe-calks and to provide a simple, inexpensive, and efficient device capable of enabling a calk to be readily applied to a horseshoe and adapted when the same becomes worn to permit it to be removed from the horseshoe without removing the latter from the hoof of a horse.

The invention consists in the construction and novel combination and arrangement of parts hereinafter fully described, illustrated in the accompanying drawings, and pointed out in the claims hereto appended.

Figure 1:
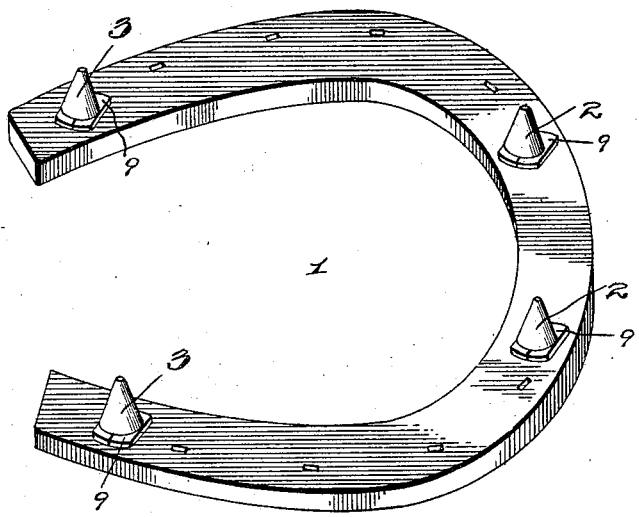
Figure 2:
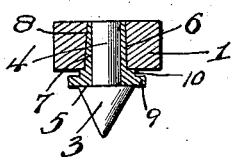
Figure 3:
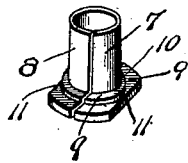
Figure 4:
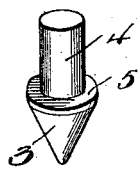

In the drawings, Figure 1 is a perspective view of a horseshoe provided with toe and heel calks constructed in accordance with this invention. Fig. 2 is a transverse sectional view. Fig. 3 is a detail perspective view of one of the split sleeves. Fig. 4 is a detail perspective view of the calk.

Like numerals of reference designate corresponding parts in all the figures of the drawings.

1 designates a horseshoe provided with toe and heel calks 2 and 3, which are pointed to prevent an animal from slipping on smooth surfaces and designed to be used in winter when snow mashes on the ground; but instead of employing pointed calks, as illustrated in the accompanying drawings, it will be readily apparent that blunt calks may be used. Each calk is provided with a round shank 4, which is of less diameter than the base of its conical portion or head, to provide an annular shoulder 5, which is adapted to form a stop to prevent the calk from being forced through the shoe against the hoof of an animal.

The shank of the calk is secured within an opening 6 of the horseshoe by a split sleeve 7, provided with a cylindrical bore or opening to receive the shank 4. The opening 6 of the horseshoe is slightly tapered, as clearly illustrated in Fig. 2 of the accompanying drawings, and the outer face 8 of the split sleeve is correspondingly tapered, and when it is driven into the hole of the horseshoe it is compressed and caused to clamp the shank, whereby the calk is securely held in place. The split sleeve is provided at its outer or lower end with a flange 9, having a boss 10 at its inner face and provided with oppositely-disposed straight edges 11, forming a wrench-seat, and it is adapted to be readily worked loose by a wrench. The boss 10, which is formed by thickening the inner portion of the flange, offsets the flange from the face of the horseshoe, and thereby enables it to be readily engaged by a wrench or other tool.

The edges of the flange 9 are rounded between the straight portions 11, and the device is driven into the opening 6 of a horseshoe by a hammer or other suitable tool. The flange 9, by extending beyond the calk, is adapted to be placed on a suitable anvil or support, and the calk may then be driven out of the sleeve by a punch or plunger.

The invention has the following advantages: The calk, which is simple and comparatively inexpensive in construction, is strong and durable, and it is detachably mounted on the horseshoe and may be readily removed therefrom when it is desired to renew it or to change a sharp or pointed calk for a blunt one. The tapering sleeve engages the tapered opening of the horseshoe and is thereby compressed against the round or cylindrical shank of the calk, whereby the latter is firmly held in position and there is no liability of the shank of the calk being forced through the horseshoe into engagement with the hoof of an animal.

Changes in the form, proportion, size, and the minor details of construction within the scope of the appended claims may be resorted to without departing from the spirit or sacrificing any of the advantages of this invention.

What is claimed is—

1. In a device of the class described, the combination of a horseshoe having a smooth tapered opening, a calk having a round shank and having a shoulder, and a split compressible sleeve having smooth inner and outer faces and provided with a cylindrical bore or opening for the reception of the shank of the calk, said sleeve being exteriorly tapered to be driven into the tapering opening of the horseshoe and capable of being readily removed therefrom without detaching the said shoe, substantially as described.

2. In a device of the class described, the combination of a horseshoe having a tapered opening, a calk consisting of a head and a shank of less diameter than the head, and a split compressible sleeve having smooth inner and outer faces and receiving the said shank and being exteriorly tapered to engage the opening of the horseshoe, said sleeve being provided with a flange 9 projecting beyond the calk and having a boss at its inner or upper face, whereby it is offset from the horseshoe, substantially as described.

In testimony that I claim the foregoing as my own I have hereto affixed my signature in the presence of two witnesses.

JOHN WALLACE MILLER.

Witnesses:
ALVIN H. SCHMECK,
H. R. MILLER.